United States Patent [19]
Rybak

[11] 3,800,087
[45] Mar. 26, 1974

[54] DEFORMABLE ELECTRONIC COMPONENTS AND CIRCUITS

[76] Inventor: Boris Rybak, 35, Avenue du 6 Juin, Caen, France

[22] Filed: May 11, 1972

[21] Appl. No.: 252,294

[30] Foreign Application Priority Data

Mar. 16, 1972 France ........................ 72.09119

[52] U.S. Cl. ........................ 179/1 R
[51] Int. Cl. ........................ H04m 1/00
[58] Field of Search ........................ 179/1 R

[56] References Cited

UNITED STATES PATENTS 3,626,096 12/1971 Muench ........................ 179/1 R

*Primary Examiner*—Ralph D. Blakeslee
*Attorney, Agent, or Firm*—Karl W. Flocks

[57] ABSTRACT

Electric component of small overall size and low weight, the characteristic value of which is variable in that it is carried by a deformable substratum; the component is in conductivity relation with other elements through deformable conductors and terminals; the component may be an elementary one such as resistance, capacitor, solenoid, photo-sensitive material and leads to complete circuits such as switches, rectifiers, pression-detectors, microphones and the like, while said conductors and terminals may namely be used in the tension feeding of artificial pacemakers.

27 Claims, No Drawings

DEFORMABLE ELECTRONIC COMPONENTS AND CIRCUITS

In the field of electro-mechanical and electro-electrical transductions especially, but also electro-frigorific or electro-optic, solid physics employs rigid materials or materials which only permit limited deformations following a variable geometry which does not allow static deformation, folds and other flexible or chiefly elastic working, to such an extent that, on the one hand, the production cost is relatively high and on the other hand the substratum does not present a group of associated characteristics which ensure high performances, such as: lightness — for a hybrid or other assembly —; small overall size - even use of the component or the circuit itself in small spaces having to be filled - solidity, extensive linearity in operation without mechanical hysteresis, excellence of response at the threshold (sensitivity) and in frequency (time constant), namely suitable modules for traction, compression, elasticity, torsion (that is to say moment and polar module of inertia).

The present invention relates to the construction as products of electronic components and circuits obtained from pliable, flexible or elastic substrata, and to that of products described hereinafter without any limitative sense, which utilize these components and circuits. The present invention thus covers all these new components and circuits and all the instruments from which they are derived by way of new industrial products.

Thus, by way of indication, resistances and capacitors have been produced on suitable papers or cardboard, on certain ordinary fabrics or on materials specially woven with elements in the form of treated wires or tabs, following one of the methods forming the object of the invention, on suitable plastic materials, on rubber and on elastomers, the invention covering all forms, surfaces, volume, by way of indication; and all materials having the properties of flexibility or elasticity in their separate use or in combination with other circuits and components of the same type or of conventional types: non-limitative examples, coils, solenoids, magnets, irrespective of their uses, that is to say by way of indication: as resistances, condensers, induction coils. This light and deformable substratum may advantageously be constituted by an adhesive tape irrespective of what the chemical composition and the treatment of this substratum tape may be.

From these pliable, flexible or elastic substrata, whatever their form may be, a thin layer, electro-conductive, electro-semi-conductive, photo-electric conductive or magnetic or magnetizable, is deposited, depending on the use considered, either in the mass of the material of the substratum chosen during the course of manufacture, or at the surface of such substrata, the method of application depending on the use for which the component or the circuit of the said invention is intended. In the case of a surface deposit, the invention covers, for the manufacture of these said products, all usable methods, namely by way of indication: metallization by electro-plating, metallization by evaporation under vacuum, adequate transfer, a chemical reaction like one of those used for the silvering of conventional mirrors, the spreading of paint, the stencil, the serigraphy of conductive, semi-conductive, photo-conductive, magnetic or magnetizable substances, by way of indication.

By way of example, and therefore without limitation, the manufacture of an electric resistance may advantageously be carried out by utilizing sheet or extruded nylon as a substratum, and placing in front a mask outlining the morphology chosen for the resistance, for example a uniform rectangular surface, and then evaporating silver or gold — by way of indication — under a pressure of the order of $10^{-5}$ torr. By way of indication, there may be employed a wire of virgin silver of 6 cm. in length placed at a few centimetres from the mask-nylon unit for two minutes.

To give a numerical example, a rectilinear resistance of 2.7 cm. in length by 0.8 mm. in width has a resistance of 10 Ω for an average thickness of silver deposit of $54 \times 10^{-3}$ μ, a resistance of 50 Ω for an average thickness of $10.8 \times 10^{-3}$ μ, a resistance of 120 Ω for an average thickness of $4.5 \times 10^{-3}$ μ, a resistance of 150 Ω for an average thickness of $3.6 \times 10^{-3}$ μ; the resistance per metre of a line of 8/10 mm. in width for an average thickness of $4 \times 10^{-3}$ μ is of the order of 3500 Ω/m. By appropriate folding or winding — or by any other geometric shaping — high resistances can thus be obtained which are reliable, light and of small dimensions.

By way of example and therefore without any limitation, the manufacture of an electric capacitor can advantageously be effected by utilizing sheet or extruded nylon as a substratum, placed behind a mask outlining the morphology selected for the plates, and then evaporating silver or gold — by way of indication - at a pressure of $10^{-5}$ torr.

By way of indication, there may be employed for this purpose a wire of virgin silver of 6 cm. in length, placed at a few centimetres from the mask-nylon unit for two minutes. To give a numerical example, two rectangles, each having a length of 17 mm. and a width of 14 mm., are uniformly metallized with silver, one alongside the other on a surface of a sheet of nylon, two lengths being made face to face and marking a non-metallized division of the order of 0.8 mm. in width. The nylon sheet thus treated is then folded like a book, utilizing the non-metallized zone as the folding line, so that the two metallized rectangles are located on the outside and that they are separated by two thicknesses of the nylon sheet. The capacity per square metre is 0.1μ F and in the example cited in the reference, there is obtained a capacity of the order of 28 pF.

The patent obviously covers the product resulting from an alternative method of manufacture which consists, by way of indication, in proceeding to evaporate silver, successively or not, on the two faces of the nylon sheet, so that these metallized parts constituting the plates of the capacitor are facing each other. Under these conditions, the capacity per square metre, as this has been determined experimentally, is 0.2 μ F, and with rectangles of the dimensions given in the preceding example, there is thus obtained a capacity of the order of 56 pF.

For the production of a self-inductance utilizing as the substratum - by way of indication - as in the previous examples, a nylon sheet and metallization of silver under vacuum, the mask defining, in a rectangle of 3 cm. in length, 5 non-rectangular parallelepiped and 2 complementary triangles.

The nylon sheet thus treated is then folded to the shape of a cylinder, with the metallized zones turned towards the interior and constituting a circuit, the turns of which outlined by the parallelepipeds and the rectangles are closed along the generator line of this cylinder, for example by means of the conductive adhesive claimed in the patent. In the present case, the 5 parallelepipeds and the 2 complementary triangles form a circuit of 6 turns for a cylinder of 4 mm. in diameter, the inductance $\alpha$ being of the order of 2 nH.

A number of self-inductances of this type can easily be coupled as self-inductances or as a mutual inductance. A deposit of iron filings or iron and/or paramagnetic alloys may be effected on a solid, flexible or elastic substratum and may serve as a magnetic core which is movable or elastic if so desired.

The invention forming the object of the present patent obviously covers by way of new industrial products the junctions between components whether in the case of current-conducting wires of silver or copper — by way of indication — or flexible or elastic metallized conductors, as indicated in the present patent.

In the case of a junction by wires, it is effected either:

1. By joining the components to the selected point by piercing the sheet of plastic material, by way of indication, and establishing a ring by torsion or welding — by way of indication — of this conductor, or 2. by sticking by means of an electrically-conductive adhesive also covered by the present patent by way of a new industrial product and which is constituted, by way of indication, by a rubber solution in which is uniformly incorporated a powdered substance being a conductor of electricity - silver passing through a mesh diameter of 200 $\mu$ by way of indication. This glueing may be sufficient in itself or it may be used to fix a wire or sheet junction conductor of metal.

Circuits of this kind may advantageously be treated subsequently by metallization under vacuum for example, in order to form the electrical connections, if so desired. Threads of suitable plastic material or tongues of thickness, width and length selected of suitable flexible or elastic plastic material (by way of indication, nylon) may advantageously be utilized as junction conductors, and which have been subjected to a metallization treatment following one of the methods described above in the preamble to the present description, the junction being then advantageously obtained by means of the conductive adhesive.

A conductor of this kind constituted, by way of indication, by a tongue of silvered and varnished nylon can be used, due to its solidity, as a conductor when there is a need — as in the case of artificial "pace-makers" — for conductors subjected to shear, torsion and traction stresses which are not negligible over a long period, this aspect of the invention being also covered by this patent by way of a new industrial product.

Instead of depositing, by way of indication, an electro-conductive layer on the surface of a sheet of nylon or a sheet of latex, under a mechanical tension or not, there may be deposited, by any suitable method, a coating of semi-conductive substances or alternatively a coating of light-sensitive substances such as — by way of indication — cadmium sulphide doped with copper for example, which renders the layer sensitive to light.

The invention forming the object of the present patent obviously covers by way of new industrial product, the photo-electric product as a component and as a photo-electric cell in general, whether this cell functions, in a non-limitative manner, as a photo-voltaic cell:

1. With a stopping layer (and the invention also covers the use of the product of this application as a current rectifier);
2. as a photo-diode and a photo-transistor (whether operating as a light-resistant cell or not).

Furthermore, it is obvious that the flexible or elastic, adhesive or not, components metallized or having their surfaces rendered in one way or another, reflecting to light, are also covered by the patent as a new industrial product, namely deformable mirrors.

In all the cases given by way of indication to illustrate the invention, the thin coatings may be covered with a varnish for the purpose of protecting the deposit chosen. The invention also covers this new industrial product together with that resulting from the metallization of the adhesive portion of an adhesive tape, so that adherable circuits are thus easily produced and are protected by the other face of the adhesive tape during the convenient application by adhesion of the component or circuit on a neutral substratum, but the adhesion may be conveniently effected on another component or circuit adhering or not to one face or the other. It is clear that irrespective of the method of sticking, of which the descriptions given here must not be considered as anything other than indications — electro-conductive adhesive, adhesive tape with a component or circuit on the adhering face — the adhesive may be made equally well semi-conductive as photo-conductive, depending on the ingredients which are incorporated in it, all these applications constituting as many new industrial products covered by the patent.

The invention forming the object of the present patent obviously covers not only flexible or pliable components or circuits following any geometric shape and topology, but also any component or circuit applied by one of the methods cited in the text of the present patent on an elastic substratum: natural rubbers and synthetic elastomers, whether they are utilized as such or after a treatment such as for example vulcanization.

For electric and photo-electric components and circuits without limitation, to give an example by way of indication, there may be employed threads of sections variable in geometry and in dimensions, sheets and any mouldable object produced especially from latex. For this purpose, there may be employed, by way of indication, an ad hoc coagulent and a suspension of 95 percent of latex comprising wholly or partly and by way of indication, one or a number of anti-oxygens, diphenols, diethyl-dithiocarbamate, and, if required, an opacifying agent such as titanium oxide.

It is clear that with these deformable and especially elastic components and circuits, it is possible to manufacture a number of products which would constitute logical derivatives. Thus, if for example silver metallization is effected, by way of indication, by evaporation under vacuum, without the part to be metallized being subjected to any elongation during the metallizing, it is possible by means of electro-conducting adhesive, containing silver for example, to fix two conductors which will be adapted to the measuring or control equipment, in such manner that if a certain current passes when the elastic conductor is not under tension, it ceases to pass when a certain tension is applied on this elastic conductor and there is thus obtained a current-breaking switch covered by the present patent by way of a new industrial product.

In this way also, elastic conductors metallized or not under mechanical tension may serve with appropriate associated assemblies as, non-limitatively, elastimeters, resistimeters, calibration condensers, speed and acceleration indicators, by utilizing, by way of indication, weight-heads for a centrifugal assembly. They may also serve as measuring instruments for elongation or retraction in an automatic positioning assembly or as thoracic pneumographs, and this is the case whether the elastic components and circuits forming the objects of the invention function as resistances, as capacitors, as photo-electric cells, as solenoids of variable lengths, all these devices being covered in a non-limitative manner by the present invention as new industrial products and especially the coil-spring solenoid, whether it is entirely constituted by the component described in the present patent or formed in a hybrid manner with a coil spring playing the part of a solenoid.

Generally speaking, these new pliable, flexible or elastic components and circuits quite naturally permit the construction, by way of new industrial products covered by the present patent, of a number of instruments the description of which is given below without limitation, and in which there may be employed — without limitation — either variations in electric resistance, or variations in electrical capacity, or variations of induction, or photo-electric variations, or photo-reflection variations.

As other examples of new industrial products covered without limitation by the present patent, there may be naturally first considered a pressure detector of simple and rapid production and therefore having a low cost price which renders the instrument disposable after a first use. The manufacture of this pressure-detector, which may be adapted to a catheter and in consequence may serve especially in physiology, pharmacology, medicine and surgery, may advantageously be carried out in the following manner:

On a mandrel of suitable dimensions and constituted by way of indication by a needle, preferably of aluminium, there is moulded a small cylindrical bulb, by way of indication, using for example the suspension of latex described in the present patent and which has a very good modulus of elasticity.

This kind of small elastic hood which may be for example 20 mm. in length and about 2 mm. in external diameter, is subsequently, by way of indication, metallized with silver by evaporation under vacuum and under mechanical tension, for example, on a mandrel having a diameter substantially greater than that of the hood or on a stretcher of the type employed by glove makers and having its basic diameter adapted to the hood. In this way, during the operation of the elastic part, the conductive silver particles are suitably distributed without the switch effect described above being capable of occurring.

Advantageously during the course of metallization, there may be placed towards the closed portion of this hood and in its interior, a relatively solid member (by way of indication a piece of catheter about 2 mm. in length and 1.8 mm. in external diameter) which will subsequently serve as a supporting zone when the outer metallized part of this zone of the elastic bulb is enclosed by means of conductors, these conductive wires being advantageously constituted by silver of 2/10ths mm. in diameter for example. Or it could be managed a window of convenient size in any catheter, or any cylinder extending outwardly therefrom — preferably at the distal part thereof — and the metallized elastic membrane, coated or not, being applied upon in such a way that it covers the said window.

After metallization, it will be verified that the outer surface is a conductor of electricity. If this is so, the end portion, closed and consolidated, of the elastic hood is surrounded by the conducting wire, and the open part of the hood is fitted on the catheter of suitable dimension, after which there is wound round this zone a further enclosure of conducting wires.

It should be noted that the conductors may be formed by the metallized conductors described in this patent. If the surface is not sufficiently conductive, a fresh metallization is carried out. By way of indication, it is possible to consolidate the junction between the metallized hood and the windings of wires or small metallic sheets by means of an adhesive which is electrically conducting (rubber solution with silver for example).

An alternative method of manufacture consists of effecting the metallization by evaporation under vacuum, the elastic hood being already fitted to its catheter. For measurements of blood pressure, or even vein pressure, in view of the sensitivity of the instrument, the supply is made with direct current at a voltage of 3 volts, passing through a resistance of the order of 1000 – 1400 Ω, but it is clear that if the supply voltage is increased, the sensitivity of the instrument will also be increased.

In order to give a numerical indication, if a silver metallized hood of this kind has in a state of rest a resistance of the order of 1000 Ω / cm., when it is stretched, the value of the resistance tends towards infinity. For measurements, the hood and the associated catheter are partly or wholly filled with a suitable liquid, and experience shows that linear responses are obtained up to more than 300 torr of positive pressure and several torr in negative pressure, the values being given by way of indication.

It is advantageous at the same time to protect the external metallization of the hood and to avoid parasitic vibrations during the course of measurement, to enclose the metallized elastic hood and its conductive contacts in a receptacle of any kind — advantageously of cheap transparent plastic material — and obviously closing by an adhesive or suitable resin the open portion of this receptacle, but also by fixing the closed extremity of the hood with a glue or resin in such manner that only the variations of elasticity and therefore of electrical resistance appropriate to the phenomenon which it is desired to measure are recorded.

It is useful to emphasize that this instrument is not heat-sensitive.

It follows directly from these descriptions that these new components and circuits are utilizable for the construction of detectors responsive to any instantaneous change of mechanical states under thermal conditions compatible with the chemical nature of the pliable, flexible or elastic substratum.

By way of new industrial products covered by the patent, the instrument may serve as a pulsation detector and also as a barometer.

With the elastic detectors described, the frequency response and the sensitivity of an elastic instrument metallized by one of the methods above-described and covered by this patent, makes it possible to construct a vibration detector and in particular a microphone by proceeding, by way of indication, in the two following manners which both rest on this consideration that the vibration of the metallized elastic diaphragm must, in order to be microphonic, be associated with a diaphragm stretched in such manner that during the course of the vocal range (between the extremes of 54 cycles and 2760 cycles per second for human beings) there must not exist any symmetrical bending of this diaphragm with respect to its position of rest because, in this case, the electrical resistance corresponding to the curve of the diaphragm in one direction and the electrical resistance corresponding to the curve of the same diaphragm in the other direction would not result in a sinusoidal curve and would result in peak clipping.

The two devices act therefore to stretch the metallized elastic diaphragm in a single direction, which amounts either to maintaining it under tension at its centre by forming this diaphragm mounted on a support as a cornet, or to mould a cone of latex for example and to hold it under tension by its point, or to deflate by lowering the internal pressure below the atmospheric pressure using for example a syringe, or to inflate the microphonic detector with a gas at a fixed pressure, so that in this case as in the others, the vibrating arcs defined for the various frequencies are always counted with respect to a surface of the plane of rest of the diaphragm.

A first microphonic instrument covered by the present patent by way of new industrial product, may be advantageously constructed, by way of indication, by utilizing a frame of any desired shape but advantageously circular, fixing thereto the metallized diaphragm with the metallized side towards the source of sound or indifferently towards the opposite side, and fixing to the centre an attachment point which gives an appearance in the shape of an acoustic horn to the instrument, the diaphragm being connected, in a non-limitative sense, to a suitably amplified magnetic recorder, the metallized diaphragm operating with an electrical device according to the simple assembly described for pressure detectors.

However, the fragility of this device arranged as an acoustic horn leads preferably — without however excluding the preceding instrument of the present patent — to proceed in the reverse sense, from which there results two new microphones covered by this patent by way of new industrial products.

By way of indication, a first microphone of this type — which will be considered as a microphone with a positive gas pressure — is constituted by a funnel, of glass in a non-limitative sense, in which the base of the cone is covered by the metallized elastic diaphragm, as has been indicated above, after which there is applied by means of a syringe piston for example, a constant pressure of air which will produce a constant external curvature at rest of the metallized diaphragm, whether this latter is outside or inside the cone.

A concrete example is given below by way of indication and is covered by the patent as a new industrial product: a latex diaphragm of the type utilized for surgical glove fingers is metallized on one face by evaporation of virgin silver under vacuum. The contacts are stuck on and the assembly is fixed on the base of a glass funnel of 5 cm. in diameter. The measured resistance is about 10 Ω / cm. for a thickness of the silvered layer of $4 \times 10^{-3}\ \mu$. With a series resistance of 82 Ω, the unit delivers 100 mA at 9 volts direct current (it is clear that the device could be supplied with alternating current with a low-frequency signal generator — if so desired a wobbulator — and the assembly with this device is covered by the patent as a new industrial product; however, the supply by means of direct current gives full satisfaction with respect to fidelity of the recording).

By way of indication, a second microphone with a positive gas pressure, also covered by the patent by way of a new industrial product, is still more simply constituted by a balloon advantageously inflated with air, this balloon being also made of an elastic substance forming a metallized diaphragm, as indicated above, the conductors of any type whatever described in this patent being stuck by the conducting adhesive covered by this patent.

These balloon-microphones may be filled with a gas such as hydrogen, so that a lifting force is given to this balloon and, if it has a sufficient volume to be capable of lifting a radio-transmission device included in the balloon itself or fixed to a small nacelle — the two devices being covered by the patent by way of new industrial products — these microphones find a use in meteorology by way of indication, but any other application is also covered by the patent.

It should also be especially noted that when the gaseous pressure or the constant tension is no longer applied to the microphone device, generally speaking, the microphone becomes transformed to a pressure detector so that the invention covers the microphones in this double sense as new industrial products.

Having available this new type of microphone based on these new principles, it is clear that these microphones can be employed on the one hand in inflatable pressure arm-bands with a microphone, this device being also covered by the patent as a new industrial product. These microphones can obviously serve as reading heads for pick-ups and such an instrument constituted by the needle transmitting its vibrations to the new microphone, supplied under suitable conditions, some of which have been indicated above without limitation, is also covered by the patent as a new industrial product.

It is also clear that these new microphones may readily be miniaturized to the point of being fixed to a catheter in order to proceed, by way of indication, to carry out intra-cardiac phono-cardiography. To this end, the following instruments, the construction of which are given here by way of indication, may be manufactured rapidly and inexpensively, and are covered by the patent as new industrial products. A catheter of the type utilized for functional cardio-vascular exploration is, by way of indication, cut-out transversely so as to separate-off a length of about 3 cm. One extremity of the light of this catheter is closed by a glue or a resin in such manner as to form an external dome giving a suitable hydrodynamic or haemo-dynamic profile; a window of about 1 cm. in length and with a secant opening proportional to the diameter of the catheter is formed along the generator line of the cylinder thus defined.

An elastic cylinder of latex for example and having suitable dimensions — that is to say such that they permit adjustment of the interior of this elastic cylinder to the exterior of the catheter at the level of the window — is metallized by way of indication, by evaporation of silver under vacuum, as has been described in this patent, after fixing by adhesive as has been indicated above.

When the electrical conductivity has been verified, this cylinder is very carefully turned over like a glove finger, after having been varnished or not; the conductors are introduced through the window in the direction of the open section of the catheter tube of 3 cm. in length, and this cylinder is engaged like a sheath around the catheter so as to completely cover the window.

The electrical conductivity is verified, and if it does not prove adequate, the whole piece is again metallized by one of the methods described in this patent. When the conductivity proves to be good, this head is fixed on a rigid or semi-rigid entrance tube by forcing for example into the orifice of this head and of the long portion of the catheter which has not been treated; the conductors are obviously passed inside this junction tube.

The mounting of the instrument covered by the patent as a new industrial product is completed by sticking at the level of the head-catheter junction, and thus sticking may be effected with any suitable glue or resin or, depending on the chemical composition of the catheter, by self-adhesion.

For the utilization as a microphone, especially before intra-cardiac catheterism, air is introduced under pressure through the open orifice — outside the subject to be catheterized — of the catheter and care must obviously be taken that this pressure remains constant, as it must for all the gas-pressure microphones covered by the present patent as new industrial products.

Another assembly also covered by the present patent consists of cutting as a whistle one extremity of the catheter following a sufficiently acute angle in order to free the light from the head of this catheter over about 1 cm., and an elastic hood metallized on the inside and with suitable electrical connections is then fixed to the end portion of the catheter which works as a microphone for phono-cardiography after being put under gaseous pressure, as in the previous type of instrument. Under this gaseous pressure, the microphone works as a pressure detector if the fixing tension of the elastic cylinder on the catheter is suitable.

These new deformable components and circuits finally permit the measurement of any inherent or applied mechanical deformation, and all the instruments which are derived therefrom are covered by the present patent by way of new industrial products.

I claim:

1. An electric component of small overall size and low weight, the characteristic value of which is variable, comprising a deformable substratum in the form of a sheet of flexible material; a motif carried by said substratum, said motif having suitable electrical characteristics corresponding to the desired nature of said component per se; and associated to said component, in conductivity relation, terminals and conductors also realized on a flexible material, fixed by a flexible adhesive which is rendered conductive, whereby said resultant electric component has a characteristic value which is variable by deformation of said deformable substratum, while said terminals and conductors have high electrical conductivity performances whatever their mechanical deformations may be.

2. An electrical component as claimed in claim 1, in which said substratum is constituted by a sheet of at least one flexible or elastic material chosen from the group consisting of natural rubber and synthetic elastomers, plastic materials and woven and non-woven fabrics.

3. An electrical component as claimed in claim 1, in which said sheet of flexible material is constituted by an adhesive tape of plastic material.

4. An electrical component as claimed in claim 1, in which the motif having suitable electrical characteristics is carried by at least one face of said deformable substratum.

5. An electrical component as claimed in claim 1, in which the motif having suitable electrical characteristics is included in the mass of said deformable substratum.

6. An electrical component as claimed in claim 1, in which said motif exhibits suitable electrical characteristics by means of a film of a material chosen from the group consisting of a metal such as silver, gold, of semiconductive, light-conductive, light-reflecting, magnetic and magnetizable materials.

7. An electrical component as claimed in claim 1, in which said terminals and conductors have high electrical conductivity performances by means of a film of a material selected from the group consisting in metals such as silver and gold, said terminals and conductors being namely utilized for the feeding of artificial pacemakers.

8. An electrical component as claimed in claim 1, in which the conductive adhesive is constituted by a rubber solution in which is uniformly incorporated a powder of a conductive material such as silver, together with stabilization additives comprising anti-oxygens, diphenols, diethyl-dithiocarbamate and, when so required, an opacifying agent such as titanium oxide.

9. An electrical component as claimed in claim 1, in which the substratum-motif-terminals assembly is coated with a protective varnish.

10. An electrical component as claimed in claim 1, in which said motif having suitable electrical characteristics is a constituant of an electronic circuit chosen from the group consisting of resistance, capacitor, solenoid, induction coil, rectifier, photo-electric cell, magnetic core and magnet.

11. An electric circuit having variable characteristics, said circuit comprising at least one electrical component carried by a deformable substratum and thus causing said characteristics to vary, constituted by a sheet of flexible, in some case elastic, material itself carrying a component motif having suitable electrical characteristics together with flexible, in some case elastic, terminals made electrically conductive, and in which the variation of the characteristics by deformation of said substratum is utilizable by associated external circuits chosen from the group consisting of amplifiers and measuring instruments, said deformation of the substratum resulting in variations of electrical resistance.

12. An electrical circuit as claimed in claim 11, constituted by a detector of vibrations and pulsations.

13. An electric circuit as claimed in claim 11, constituted by a microphone, comprising a diaphragm made conductive, suitably stretched and being especially adapted to constitute a sound detector, a phono-cardiograph, a phono-cardioscope miniaturized to the extent that it can be used as a catheter.

14. An electric circuit as claimed in claim 11, constituted by a microphone, comprising an elastic balloon inflated by a gas having a lifting force and a system of radio-transmission of the information detected.

15. An electric circuit as claimed in claim 11, constituted by a deformable photo-electric cell.

16. An electric circuit as claimed in claim 11, constituted by a current rectifier.

17. An electric circuit as claimed in claim 11, constituted by an extensible solenoid operating in an induction system by variations of length.

18. An electric circuit as claimed in claim 11, constituted by a barometer.

19. An electric circuit as claimed in claim 11, constituted by a blood-pressure detector located at the proximal as well as the distal part of a catheter.

20. An electric circuit as claimed in claim 11, constituted by a switch device adapted to interrupt a circuit in the stretched state.

21. An electric circuit as claimed in claim 11, constituted by a speed indicator provided with fly-weights rigidly fixed to the said deformable substratum.

22. An electric circuit as claimed in claim 11, constituted by a resistimeter.

23. An electric circuit as claimed in claim 11, constituted by an elastimeter.

24. A method of manufacture of an electrical component carried by a deformable substratum constituted by a sheet of flexible or elastic material, in which: the structure of the desired component is drawn on said substratum, a deposit is effected of material with suitable electric properties, flexible terminals rendered conductive are fixed by means of a conductive adhesive and the assembly obtained is coated, if so desired, by means of a protective varnish, whereby there is obtained an electrical component, the characteristic values of which are varied by deformation of said deformable substratum.

25. A method as claimed in claim 24, in which the said material with suitable electrical properties is chosen from the group consisting of a metal such as silver, gold, of semi-conductive, light-conductive, light-reflecting, magnetic and magnetizable materials.

26. A method as claimed in claim 24, in which the deposit of material with suitable electrical properties is effected by a method known per se, chosen from the group consisting of evaporation under vacuum, electroplating, chemical reduction, painting, serigraphy, transfer.

27. A method as claimed in claim 24, in which said deformable substratum to be coated or incorporated is previously put under mechanical tension.

* * * * *